United States Patent
Lee et al.

(10) Patent No.: US 6,829,065 B1
(45) Date of Patent: Dec. 7, 2004

(54) GLASS SUPPORTING DEVICE OF SCANNER

(75) Inventors: Ta-Yi Lee, Taipei Hsien (TW);
Ming-Te Hung, Taipei (TW); Lung Chen, Taipei Hsien (TW); Chia-Pin Hsien, Tao Yuan Hsien (TW)

(73) Assignee: Lite-On Technology Corporation, Taipei (TW)

( * ) Notice: Subject to any disclaimer, the term of this patent is extended or adjusted under 35 U.S.C. 154(b) by 1007 days.

(21) Appl. No.: 09/667,584

(22) Filed: Sep. 22, 2000

(51) Int. Cl.⁷ .................................................. H04N 1/04

(52) U.S. Cl. ...................... 358/474; 358/487; 358/482; 271/267; 271/84; 248/205.1; 248/200; 250/208.1

(58) Field of Search ................................. 358/474, 487, 358/497, 482, 483; 271/267, 84; 355/48, 50; 248/205.1, 200, 214; 250/208.1, 234, 559.24

(56) References Cited

FOREIGN PATENT DOCUMENTS

JP        02003201791 A  *  7/2003  ............. E06B/3/58

\* cited by examiner

*Primary Examiner*—Kimberly Williams
*Assistant Examiner*—Negussie Worku
(74) *Attorney, Agent, or Firm*—Rosenberg, Klein & Lee

(57) ABSTRACT

A glass supporting device of a scanner comprises an upper cover, a lower cover, a front cover, and a glass sheet. The upper and lower covers, and the front cover can be integrated. The lateral sides of the upper cover are installed with a plurality of sliding tracks. The sliding tracks and the edges of the top of the upper cover are formed with a ⊏ shape track. Therefore, the glass sheet can be slid into the track manually for being positioned therein. The track serves for supporting the glass sheet. In the present invention, the glass sheet is easily assembled and detached. The upper cover and glass sheet is updated independently. Therefore, the assembling work is performed quickly and the cost for detaching parts are low.

6 Claims, 4 Drawing Sheets

GLASS SUPPORTING DEVICE OF SCANNER

FIELD OF THE INVENTION

The present invention relates to a glass supporting device of a scanner, and especially to a glass supporting device used in a platform scanner, wherein a track is formed for replacing the prior art double face tape or a modifying sheet. Therefore, the glass sheet can be easily assembled and detached and thus the assembling work can be performed quickly and the cost for detaching parts are low.

BACKGROUND OF THE INVENTION

Nowadays, scanners are widely used in graphing or text processing. The primary function of a scanner is to scan a document or a picture as a form readable by a computer. For example, several photographs can be scanned through a scanner into image files for being read by a computer. Then, these image files are inserted into a word document to be as a report with image and text. The current scanner can be divided as a platform scanner and a portable scanner. Furthermore, in some products, different types of scanners are integrated.

The assembling the prior art glass sheet of a scanner is illustrated in FIGS. 1A and 1B. The assembly structure includes an upper cover, a lower cover (not shown), a glass sheet 2a, a double face tape 2a and a modifying sheet 4a. The upper cover 1a and lower cover (not shown) can be integrated as a housing. The top of the upper cover is installed with a rectangular via hole 10a. The edoe of the rectangular via hole 10a is installed with a frame edge 11a. One face of the double face tape 3a is sticky to a rim of the glass sheet 2a. Then, another face of the double face tape 3a is stuck to the frame edge 11a so that the glass sheet 2a completely covers the rectangular via hole 10a. Furthermore, the modifying sheet 4a is adhered to the edge of the glass sheet 2a for shielding the double face tape 3a therebelow and as a positioning ruler. The glass sheet can be stuck to the external (FIG. 1A) or internal (FIG. 1B) of the upper cover 1A of the housing.

In the aforementioned prior art assembling way for the glass sheet, in order to prevent the glass sheet from breaking due to fall down or from being polluted by dirties, a double face tape 3a which is expansive but has a preferred adhesion is used. By the sticking of the double face tape, a pre-pressure is formed. Then, by oil pressure or vacuum machining, the glass sheet 2a is tightly fixed to the upper cover 1a of the scanner. However, although this way may enhance the sticky force, many fixtures are necessary. Therefore, the cost is high. Furthermore, after a strong sticky, once it is discovered that the glass sheet has bubbles, the parts must be detached for transferring the damaged parts to the manufacturer. Since the sticky force is large, a large force is necessary, and thus it needs a longer time. All these increase the cost. Moreover, the modifying sheet is expansive, and therefore, it is seldom used by manufacturers.

Therefore, there is an eager demand for a novel design of a glass supporting device of a scanner for improving the aforesaid defects in the prior art way.

SUMMARY OF THE INVENTION

Accordingly, the primary object of the present invention is to provide a glass supporting device of a scanner, wherein a track is formed for replacing the prior art double face tape or modifying sheet. In the present invention, the glass sheet can be easily assembled and detached. The upper cover and glass sheet can be updated independently. Therefore, the assembling work can be performed quickly and the cost for detaching parts is low.

In order to achieve the aforesaid object, the present invention provides a glass supporting device of a scanner comprising an upper cover, a lower cover, a front cover, and a glass sheet. The upper and lower covers, and the front cover can be-integrated. The lateral sides of the upper cover are installed with a plurality of sliding tracks. The sliding tracks and the edges of the top of the upper cover are formed with a ⊏ shape track. Therefore, the glass sheet can be slid into the track manually for being positioned therein. The track serves for supporting the glass sheet.

The various objects and advantages of the present invention will be more readily understood from the following detailed description when read in conjunction with the appended drawing.

DETAILED DESCRIPTION OF THE PREFERRED EMBODIMENTS

Figure 1A:
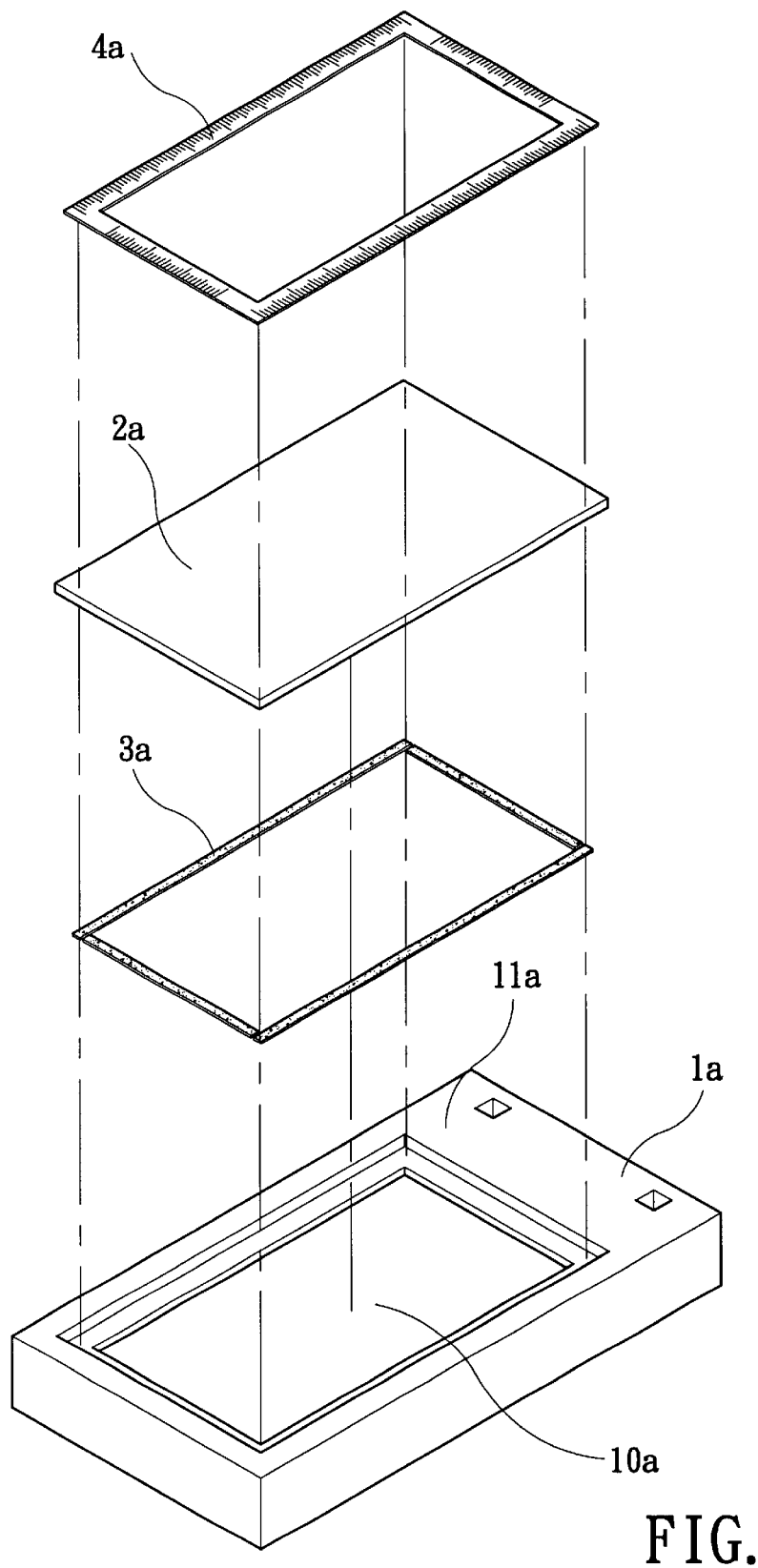
FIG. 1A is an assembled schematic view showing the scanner glass sheet in the prior art.
Figure 1B:
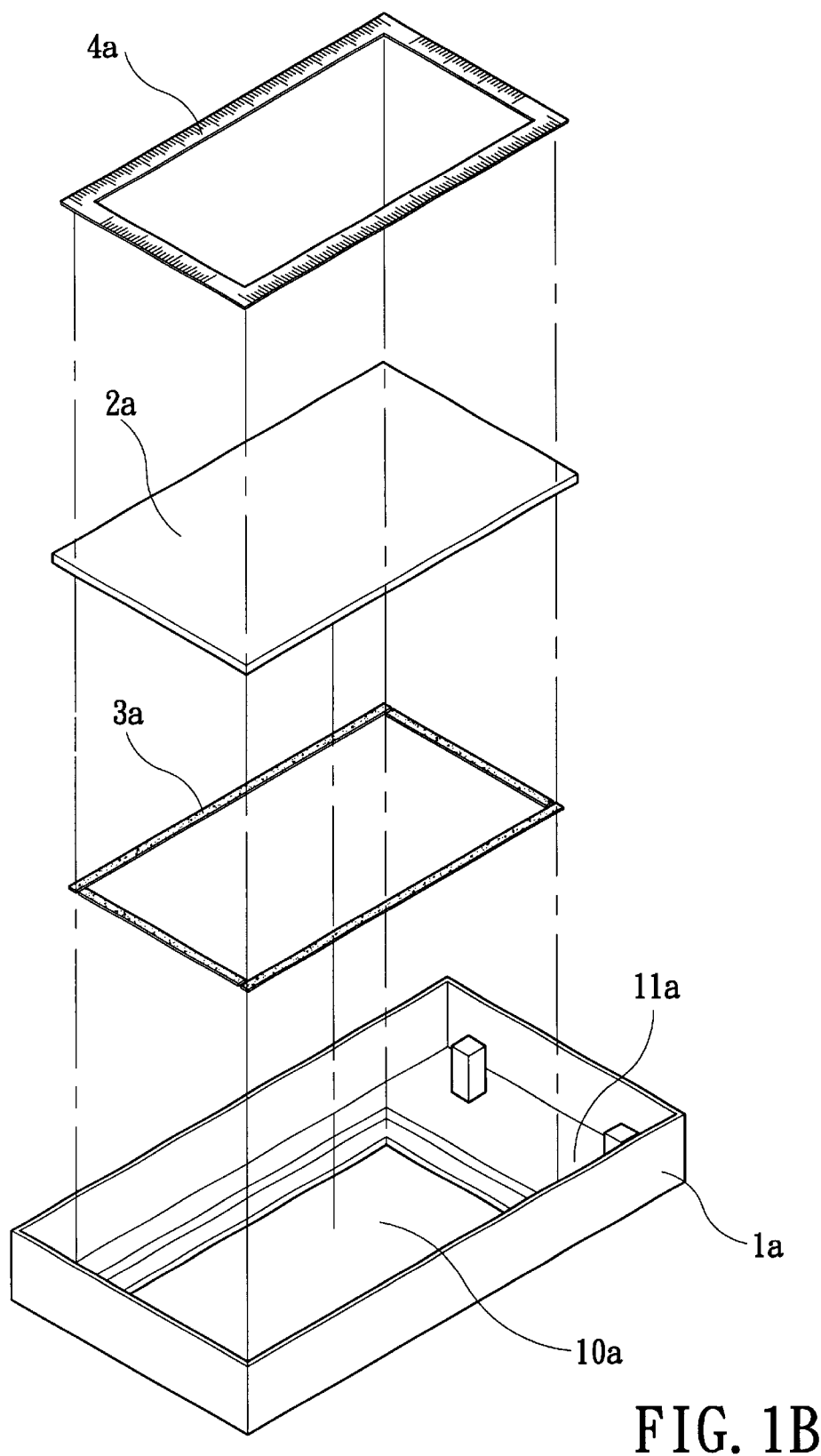
FIG. 1B is another assembled schematic view showing another scanner glass sheet in the prior art.
Figure 2A:
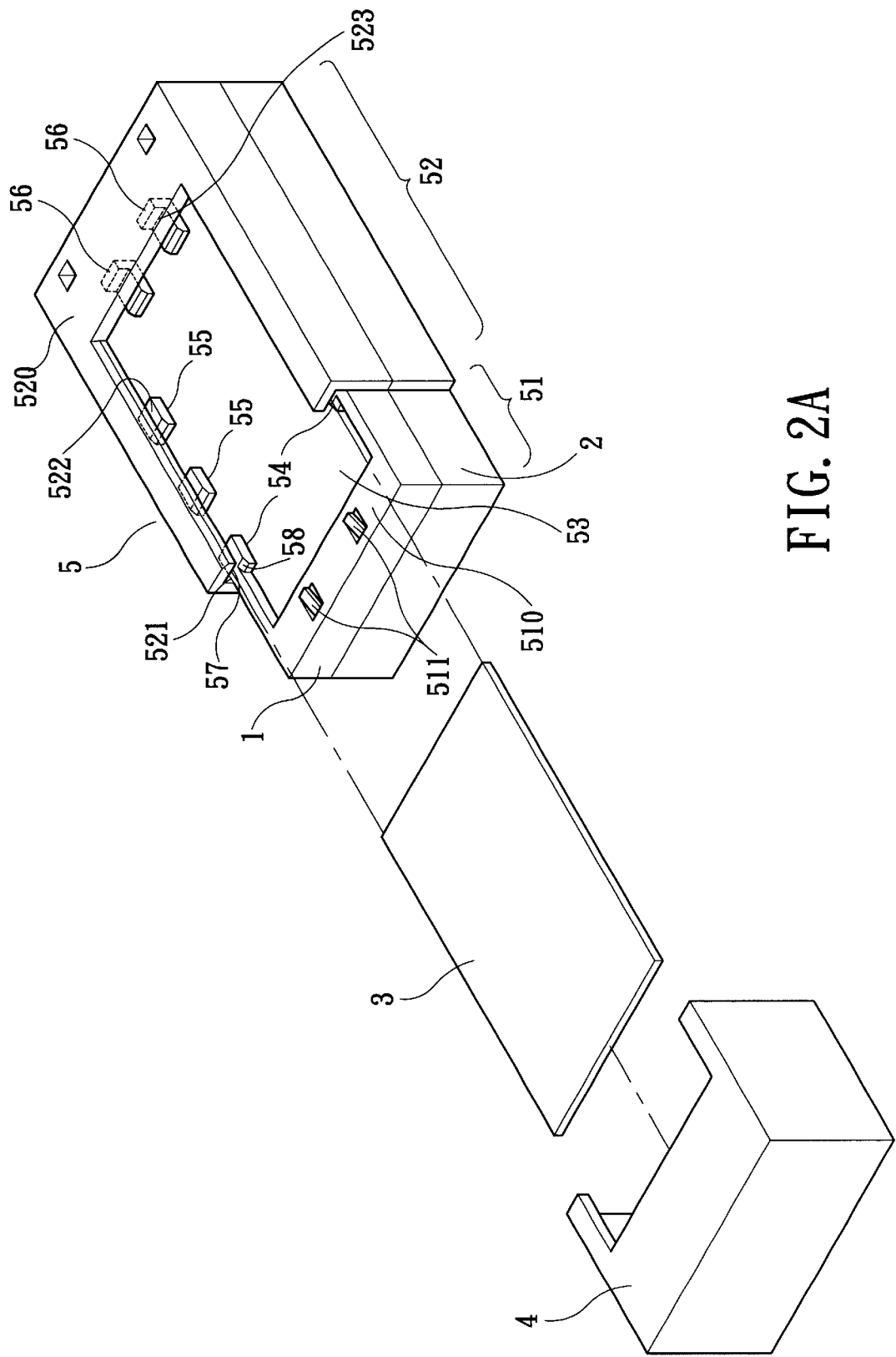
FIG. 2A is a schematic view showing the first embodiment of the glass supporting device of a scanner in the present invention.

With reference to FIG. 2A, the first embodiment of the glass supporting device of a scanner according to the present invention is illustrated. The object of the present invention is to improve the housing and glass sheet of a scanner. Since the inner structure of a scanner is well known in the prior art by those skilled in the art, thus the details will not be described herein. The glass supporting device of a scanner of the present invention includes an upper cover 1, a lower cover 2, a glass sheet 3, and a front cover 4. The upper cover 1 is fixed to the upper end of the lower cover 2. The two covers can be assembled as a hollow housing 5. The housing 5 includes a front end portion 51 and a rear end portion 52. The front end portion 51 and the rear end portion 52 of the housing 5 have a ⊏ shape, are coupled with one another and are integrally formed. The top of the housing is formed with a rectangular via hole 53. The edge frame of the front end portion 51 of the housing 5 has a top installed with two returning stop tenons 511. At the connection between two sides of the edge frame 510 at the top of the front end portion 51 and the rear end portion 52 are installed with a respective sliding track 51. The cross sections of edge frame 520 at the top of the rear end portion 52 and the edge frame 510 of the top of the front end portion 51 have a ⊏ shape. At the connection of the front end portion 51 and the rear end portion 52 has a ⊏ shape slit 521. The size of the slit 521 is exactly suitable to be tightly matched to the thickness of the glass sheet 3. The inner edges at two sides of the rear end portion 52 are installed with a sliding track 55 a plurality of protrusions. A ⊏ shape slit 522 is formed between the sliding track 55 and the edge frame 521 of the top of the slit

522. The size of the slit 522 is exactly suitable to the thickness of the glass sheet 3. The height of the sliding track 55 is flushed with the sliding track 55 at the front end portion 51. The lower edge of the edge frame 52 at the top of the rear end portion 52 is installed with an L shape sliding track 56. The sliding track 56 and the edge frame 520 of the top of the rear end portion 52 is formed with a ⊏ shape slit 523. The size of each slit 523 is exactly suitable for the thickness of the glass sheet 3. The slits 521, 522, and 523 of each sliding track 54, 55 and 56 are installed as a sliding track 57 so as to be slid by the glass sheet 3 to be fixed therein. The front end portions of the sliding tracks 54, 55 and 56 are installed with a respective slop portion 58 for guiding. Thereby, the glass sheet 3 can be easily embedded into the track 57. In assembling, the glass sheet 3 can slid into the track 57 for positioning, and then after passing through the tenons 511, the glass sheet can be completely fixed in the top of the upper cover 1 of the housing 5, and thus the front cover 4 is embedded into the front end portion 51 of the housing 5 so as to be assembled with a complete housing and to present a beautiful outlook. Furthermore, when detaching, the front cover 4 can be taken out easily. It is only needed to depress the tenons 511, the glass sheet can be retracted for being detached.

Figure 2B:
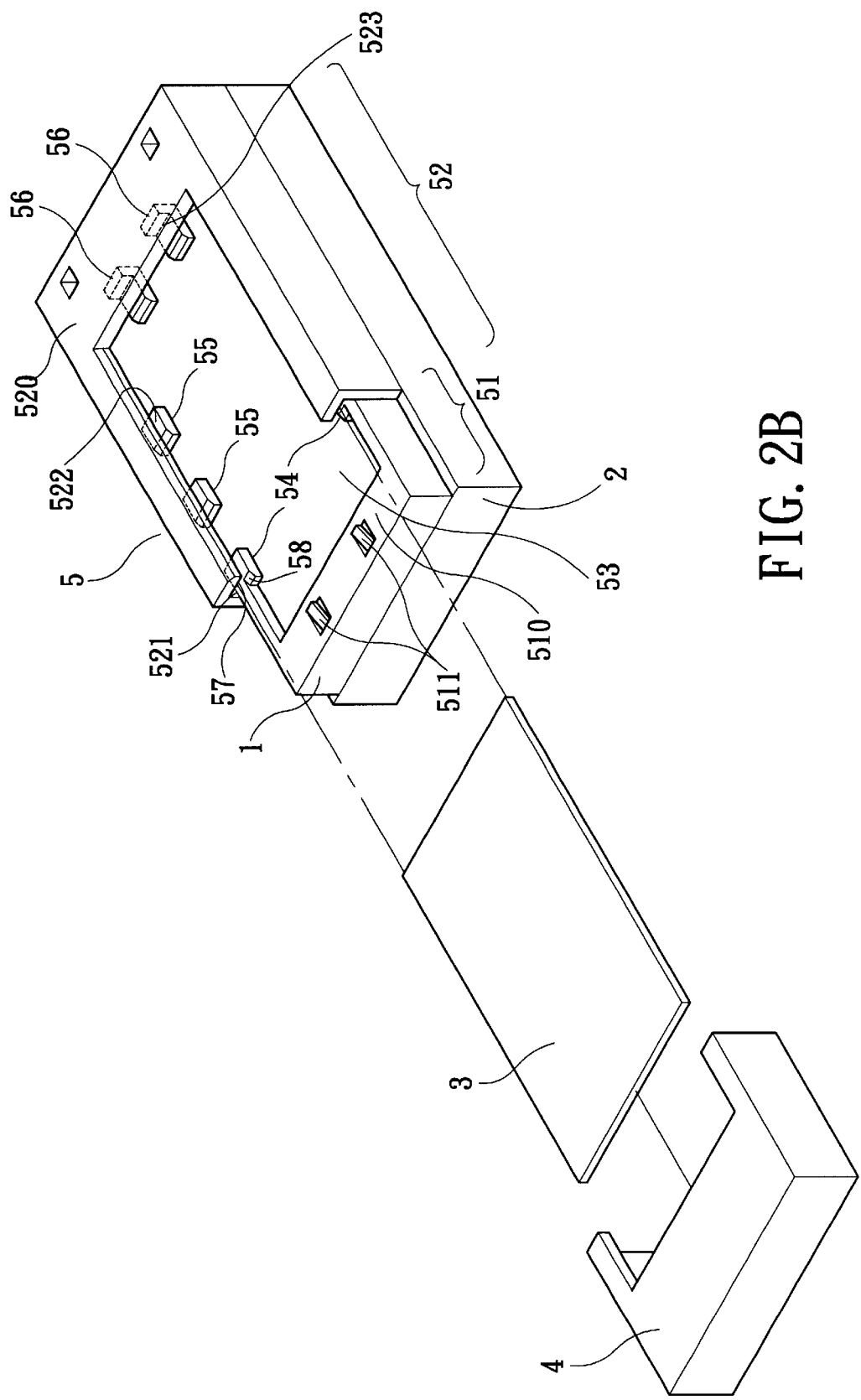
FIG. 2B is a schematic view showing the second embodiment of the glass supporting device of a scanner in the present invention.

Referring to FIG. 2B, the second embodiment of the glass supporting device of a scanner according to the present invention is illustrated. In this embodiment; the upper cover 1 is installed with a front end portion 51 and the rear end portion 52. The glass sheet 3 is directly slid into the track 57 of the upper cover 1 and fixed therein. Furthermore, the upper cover 4 is embedded into the front end portion 51 of the upper cover 1. Then, they are completely coupled with one another.

Therefore, the glass supporting device of a scanner of the present invention has the following advantages:

(1) The glass sheet can be assembled easily, and the glass sheet can be slid into the track manually.

(2) The assembly time can be reduced, the time for adhering a double face tape and for waiting the combination by pressing is removed.

(3) The costs in parts and assembly are low. The devices of adhering double face tape, vacuum suction, and oil pressure are unnecessary.

(4) The quality is steady. The tape removing or falling of glass sheet or other problem would not occur.

(5) Repairing time is shortened. The times for covering the glass sheet and repairing parts for updating a destroyed upper cover are saved.

In summary, in the present invention, the prior art assembly way for adhering a double face tape to the glass sheet is unnecessary. Therefore, the assembly and detaching are easily, and the cost for assembling parts is decreased. Moreover, the quality of the products is improved.

Although the present invention has been described with reference to the preferred embodiments it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A glass supporting device of a scanner comprising:
   a housing including a front end portion and a rear end portion; a top of the housing being installed with a via hole, and a top of the rear end portion being formed with an edge frame;
   a front cover; and
   a glass sheet;
   characterized in that: a top of the housing has a plurality of sliding tracks, a track is formed between the sliding tracks and a rear end portion; the glass sheet directly slide into the track for being positioning therein, and the front cover is embedded into the front end portion of the housing.

2. The glass supporting device of a scanner as claimed in claim 1, wherein the housing including an upper cover and a lower cover.

3. The glass supporting device of a scanner as claimed in claim 1, wherein the front end portion and the rear end portion have a ⊏ shape, are coupled, and are formed integrally.

4. The glass supporting device of a scanner as claimed in claim 1, wherein the sliding tracks are installed at the connection of two sides of a top of the front end portion and the rear end portion, inner edges of two sides of the rear end portion, and a lower edge of the edge frame of the rear end portion.

5. The glass supporting device of a scanner as claimed in claim 1, wherein the front end of each sliding track is installed with a slop portion.

6. The glass supporting device of a scanner as claimed in claim 1, wherein one end at a top of the upper cover is installed with returning stop tenons.

\* \* \* \* \*